United States Patent [19]

Wolgemuth

[11] 3,893,958

[45] July 8, 1975

[54] CATALYSTS FOR THE REACTION OF CYCLIC NITRILE COMPOUNDS WITH HYDROXYL GROUPS TO PRODUCE UREAS, URETHANES OR THIOURETHANES

[75] Inventor: Larry G. Wolgemuth, 100 E. Eagle Ln., Cherry Hill, N.J. 08003

[73] Assignee: Atlantic Richfield Company, Los Angeles, California

[22] Filed: Dec. 21, 1973

[21] Appl. No.: 427,153

[52] U.S. Cl..... 260/18 TN; 260/77.5 B; 260/77.5 C
[51] Int. Cl................................................. C08g 22/44
[58] Field of Search... 260/77.5 B, 77.5 C, 77.5 AB, 260/18 TN

[56] References Cited
UNITED STATES PATENTS

| | | | |
|---|---|---|---|
| 3,580,873 | 5/1971 | Bianca | 260/18 TN |
| 3,652,507 | 3/1972 | Bunk et al. | 260/77.5 AB |
| 3,702,320 | 11/1972 | Writok et al. | 260/77.5 B |

*Primary Examiner*—M. J. Welsh

[57] ABSTRACT

A method of preparing organic compounds having one or more urea, urethane or thiourethane groups by reacting cyclic nitrile compounds of the formula

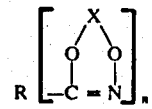

wherein X is carbonyl, thionyl or oxalyl, R is an organic radical which is free of reactive hydrogen atoms and $n$ is 1 or more, such as adipodi(nitrile carbonate), with nucleophilic compounds containing a reactive hydrogen atom, such as polyester and polyether polyols, at a temperature of about 50° to 150°C. in the presence of a combination of
1. An alkali metal salt of an organic acid, and,
2. A metal ion selected from Groups III to V of the Periodic Table.

10 Claims, No Drawings

CATALYSTS FOR THE REACTION OF CYCLIC NITRILE COMPOUNDS WITH HYDROXYL GROUPS TO PRODUCE UREAS, URETHANES OR THIOURETHANES

BACKGROUND OF THE INVENTION

The present invention relates to an improved method for preparing organic compounds having one or more urea, urethane or thiourethane groups by reacting compounds having a reactive hydrogen atom with cyclic nitrile compounds. More particularly, the present invention relates to an improved method of preparing organic compounds having one or more urea, urethane or thiourethane groups by reacting compounds having a reactive hydrogen atom with cyclic nitrile compounds in the presence of a catalyst comprising an alkali metal salt of an organic acid and a Group III–V metal ion.

In the past, it has been common practice to prepare ureas, urethanes, and thiourethanes by the reaction of an isocyanate and an active hydrogen-containing material. Although the use of isocyanates for the preparation of ureas, urethanes, and thiourethanes is quite popular and extensively employed, there are a number of problems with this reaction. First, the isocyanates are unstable and present storage and handling difficulties. Secondly, many isocyanates, particularly the aliphatic isocyanates, are highly toxic. Thirdly, the reactivity of the —NCO group precludes premixing of the isocyanate with the reactive hydrogen-containing material to form a single component system without first blocking the terminal isocyanate groups. However, curing the blocked isocyanate materials to liberate the blocking group and to reactivate the —NCO group requires high curing temperatures. Finally, in the production of foamed polyurethanes, polythiourethanes, and polyureas, via the isocyanate route, it is necessary to go through the expense and inconvenience of adding a separate foaming agent or of using an excess of isocyanate and water to obtain the required gas release.

The disadvantages mentioned above are not, however, present in a process for preparing such organic compounds by condensation of a compound containing a reactive hydrogen with a compound having the structural formula:

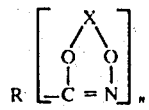

wherein X is carbonyl, thionyl or oxalyl, R is an organic radical free of reactive hydrogen atoms and $n$ is 1 or more. For convenience, the compounds identified by the above structural formula will be hereafter referred as "cyclic nitrile compounds."

There are several known techniques for carrying out the reaction of an active hydrogen-containing material with cyclic nitrile compounds in the presence of catalysts. For example, in U.S. Pat. No. 3,531,425 a process is described in which the reaction is carried out in the presence of a strong base such as tertiary amines, having a pKa above 8. In U.S. Pat. No. 3,652,507 the reaction is carried out in the presence of soluble catalysts containing a first metal from Groups III through V of the Periodic System and a second metal from Groups I, II or the iron series of Group VIII of the Periodic System. It was found in accordance with U.S. Pat. No. 3,652,507 that in most cases strongly basic materials (alkali metal alkoxides, tertiary amines, etc.) must be utilized in conjunction with the catalyst in order to obtain reaction rates which are acceptable for foam formulation. In U.S. Pat. No. 3,702,320 it is disclosed that the reaction may be carried out in the presence of a soluble compound of aluminum, tin, titanium, zinc, bismuth or iron at a temperature of about 120° to 150°C., provided that when the metal is aluminum, tin, titanium or bismuth no metal of Group I, II or the iron series of Group VIII is present and when the metal is zinc or iron, the reaction is conducted in the absence of metals of Groups III through V.

The catalyst systems described in U.S. Pat. No. 3,652,507 are effective in catalyzing the condensation-rearrangement reaction but they have disadvantages which detract from their desirability. First, they are difficult to prepare and their preparation involves several chemical steps including a purification step. Secondly, they have relatively poor storage stability and, therefore, should be freshly prepared for greatest effectiveness. Thirdly, polymer prepared using the described catalyst systems often undergoes thermal degradation upon further processing. Because of the disadvantages of the above and other known materials in catalyzing the reaction between cyclic nitrile compounds and reactive hydrogen-containing compounds, new and improved catalyst systems are continuously sought.

It is, therefore, an object of the present invention to prepare organic compounds having one or more urea, urethane or thiourethane groups by reacting a cyclic nitrile compound with an organic compound having an active hydrogen in the presence of a novel catalyst combination. Another object of the present invention is to provide an improved process for the preparation of organic compounds having one or more urea, urethane or thiourethane groups by reacting cyclic nitrile compounds with an organic compound having an active hydrogen in which it is unnecessary to utilize a strong basic material. It is another object of the invention to present a method of preparing urethane-type polymers having improved thermal stability.

These and other objects and advantages of the present invention will be apparent from the following detailed description.

SUMMARY OF THE INVENTION

A method of preparing organic compounds having one or more urea, urethane or thiourethane groups comprising reacting at least one cyclic nitrile compound of the formula:

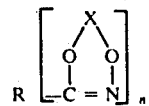

wherein X is carbonyl, thionyl or oxalyl, R is an organic radical free of nucleophilic groups as determined by the Zerewitinoff test and $n$ is 1 or more, with a nucleophilic organic compound having at least one reactive hydrogen atom as determined by the Zerewitinoff test in the presence of a catalytically effective amount of a catalyst system comprised of an alkali metal salt of an organic acid and a metal ion of Groups III to V of the Periodic Table. The reaction may be carried out at a temperature of about 50°C. to about 150°C. It is preferred to conduct the reaction at a temperature of about 70°C. to 120°C.

DESCRIPTION OF THE INVENTION

DEFINITIONS

The term urethane-type polymers is used herein to describe the polymeric compounds obtained when a cyclic nitrile compound reacts with a nucleophilic compound to produce a polyurethane, polyurea, polythiourea or mixtures of any or all of these.

The term cyclic nitrile compound is used to describe compounds containing

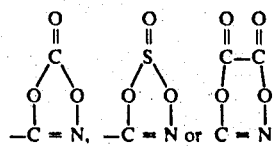

groups.

The term organic nucleophilic group is used herein to describe organic compounds having active hydrogen atoms as determined by the Zerewitinoff test.

In accordance with the invention, one or more of the nucleophilic compounds may be reacted with one or more cyclic nitrile compounds to provide a variety of organic products containing urethane, urea or thiourethane groups or mixtures of the foregoing. The products may be monomeric or polymeric depending upon the cyclic nitrile compound and nucleophile selected, the proportions of reactants employed and the reaction conditions utilized.

THE CYCLIC NITRILE COMPOUNDS

The cyclic nitrile compounds used in the invention have the structure

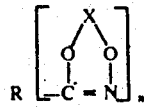

wherein X is carbonyl,

thionyl,

or oxalyl,

$n$ is at least 1 and R is an organic radical having from 2 to about 200,000 carbon atoms and is free of reactive hydrogens as determined by the Zerewitinoff test. A compound which contains a reactive hydrogen as determined by the Zerewitinoff test is one which, when contacted with a Grignard solution of methyl iodine, will effect the liberation of methane by decomposition of the Grignard reagent. Frequently R will consist essentially of carbon and hydrogen atoms and by "consisting essentially of carbon and hydrogen" is meant that the essential composition of the radical is carbon and hydrogen but that there can be included therein other elements as well, so long as they do not materially affect the radical's basic characteristic of being non-interferring in the condensation reaction of the cyclic nitrile group with the reactive hydrogen group. Examples of non-interferring groups which can be present in R and which contain elements other than carbon and hydrogen are alkoxy, nitro, and halo groups. The R radical can be aromatic, e.g., of 1 to 3 aromatic rings (fused or non-fused) or non-aromatic and when the latter, can be cyclic or acyclic and saturated or ethylenically or acetylenically unsaturated. Acyclic R's can be straight or branched chain. The cyclic nitrile carbonate group can be attached to an aromatic ring carbon atom, to a cycloaliphatic ring carbon atom or to a non-ring carbon atom.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds, such as acrylonitrile carbonate. The preparation of cyclic nitrile compounds of this type is disclosed in U.S. Pat. No. 3,480,595, the disclosure of which is incorporated herein by reference.

The number of cyclic nitrile functional groups present in the cyclic nitrile compounds used in the invention may vary from 1 to as high as 100,000 or more per molecule. In preparing high molecular weight polymers, it is usually desirable that $n$ be about 2. In the preferred embodiment of the invention, $n$ varies from 2 to about 6.

The preparation of the cyclic nitrile compounds useful in the invention forms no part of the invention, and one desiring to explore their preparation may refer to the above-mentioned patents and U.S. Pat. Nos. 3,480,595; 3,507,900; 3,609,163; 3,652,507; and 3,658,805, all of which are incorporated herein by reference.

Typical of the aliphatic cyclic nitrile compounds useful in the invention are:

1. Saturated aliphatic and cycloaliphatic compounds such as propane nitrile carbonate; cyclohexane nitrile sulfite; butane nitrile oxalate; 1,2-ethane di(nitrile carbonate); 1,4-butane di(nitrile sulfite); 1,20-eicosane di(nitrile oxalate); 1,40-tetracontane di(nitrile carbonate); 5-ethyl-1,16-hexadecane di(nitrile carbonate); 1,3,5-pentane tri(nitrile sulfite); 1,4,6,10-decane tetra(nitrile carbonate); 6-methyl-1,5,8-octane tri(nitrile oxalate); 1,4-cyclohexane di(nitrile carbonate); 2-ethyl-1,3,5-cyclohexane tri(nitrile carbonate); etc.

2. Unsaturated aliphatic and cycloaliphatic compounds such as ethene nitrile carbonate; cyclohexene nitrile sulfite; butene nitrile oxalate; 1,2-ethene-di(nitrile carbonate); 1,4-butene-2-di(nitrile sulfite); 1,6,9-nonene-2-tri(nitrile oxalate); 3-propyl-1,5,7-heptene-2-tri(nitrile carbonate); 1,4-butyne-2- di(nitrile carbonate); 1,6-hexyne-2-di(nitrile carbonate); 1,4-cyclo-hexene-2-di(nitrile carbonate); etc.

3. Aromatic compounds such as benzene nitrile carbonate; toluene nitrile sulfite; naphthalene nitrile oxalate; benzene 1,3-di(nitrile carbonate); benzene-1,4-di(nitrile carbonate); and 1,3-diethylbenzene-2,4-di(nitrile oxalate); methylbenzene-di(nitrile carbonate); 1-benzylbenzene-2,4-di-(nitrile carbonate); naphthalene-1,7-di(nitrile carbonate); 1,2,3,4-tetrahydronaphthalene-di(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile carbonate); biphenyl-di(nitrile carbonate); 1,2-diphenylethane-o,o'-di(nitrile oxalate); stilbene-p,p'-di(nitrile carbonate); and stilbene-o,o'-di(nitrile sulfite).

Although cyclic nitrile sulfites and cyclic nitrile oxalates function as well as, and sometimes better than, cyclic nitrile carbonates, they are not as suitable as cyclic nitrile carbonates since the sulfites produce sulfur dioxide, an obnoxious and toxic gas, and the oxalates produce carbon monoxide, also a very toxic gas. Since the carbonates, upon reaction, release harmless and odorless carbon dioxide, these are much more suitable for general use. Thus, the preferred cyclic nitrile compounds are the saturated aliphatic cyclic nitrile carbonates in which R contains 2–12 carbon atoms, such as 1,2-ethane di(nitrile carbonate); 1,4-butane di(nitrile carbonate); and 1,4,8-octane tri(nitrile carbonate).

THE NUCLEOPHILIC COMPOUNDS

Suitable organic nucleophilic compounds include compounds having the active hydrogen present in —OH, —NH—, —NH$_2$, —SH, —SO$_2$NH$_2$, —SO$_2$OH, —COOH, —CSNH$_2$, and —CONHR groups. The organic nucleophilic compounds preferred for use in the invention include aliphatic and aromatic polyols, polyamines, and polythiols, and polymers such as polyester polyols, polyamines or polythiols, polyether polyols, polyamines or polythiols, and polylactones and similar compounds having from 1 to 6 or more, but preferably 3 or more, —OH, —NH—, NH$_2$, or —SH groups or mixtures of these per molecule and having 2 to about 100,000 carbon atoms with hydroxyl numbers ranging from 12 to 1,100 or more. Mixtures of two or more of these compounds can also be employed.

The aliphatic and aromatic polyols, polyamines, and polythiols include, for example, ethyl alcohol; propylamine; butyl mercaptan; ethylene glycol; diethylene glycol; thiodiethylene glycol; propylene glycol; 1,3-butylene glycol; 1,6-hexanediol; butenediol; butynediol; amylene glycols; 2-methyl-pentanediol-2,4; 1,7-heptanediol; glycerine; neopentyl glycol; trimethylol propane; pentaerythritol; cyclohexane dimethanol; sorbitol; mannitol; glactitol; talitol; xylitol; 1,2,5,6-tetrahydroxyhexane, styrene glycol; bis(hydroxyethyl)diphenyl-diemethylmethane; silanediols, e.g., triphenyl silanols; 1,4-dihydroxybenzene; etc., and the corresponding amine- and thiol-containing compounds.

The polyhydroxyl-, amine- or thiol-containing polymeric compounds useful in this invention include, for instance, polyhydric polyalkylene ethers, polyhydroxyl polyesters, and hydroxyl group-containing, preferably hydroxyl-group terminated, polymers and the corresponding amine and thiol-containing polymers. The polyhydric, polyamine or polythiol polyalkylene ethers may have a molecular weight greater than about 350 and a hydroxyl number of from about 10 to 600 and may be derived, for example, by the polymerization of alkylene oxides, such as ethylene oxide, propylene oxide, butylene oxide, and the like. Polyhydric polyalkylene ethers may also be prepared by the polymerization of the cyclic ethers, such as, for example, dioxane, tetrahydrofuran, and the like, and by the condensation of an alkylene oxide with a glycol, such as ethylene glycol, propylene glycol, butylene glycol, and the like.

The hydroxyl-, amine-, and thiol-containing polyesters may be obtained by the reaction of aliphatic or aromatic dicarboxylic acids with aliphatic or aromatic polyhydric, polyamine or polythiol alcohols in the manner well known to the art in proportions that result in esters having at least two reactive hydroxy, amino or mercaptan groups. Any polyols, polyamine or polythiol alcohols may be used to form the esters, aminoesters, and thio-esters and illustrative of such alcohols, amines, and thiols are those listed above in the discussion of suitable alcohols, amines, and thiols as the active hydrogen-containing reactant. Included within the suitable esters, aminoesters, and hydroxyl-containing thio-esters are the mono and diglycerides of castor oil, tall oil, soya oil, linseed oil, etc., and the corresponding amine and thio esters. The latter esters, aminoesters, and thioesters are usually prepolymers prepared by the reaction of the fatty glyceride with low molecular weight polyhydric, polyamine or polythiol alchols. Illustrative, for instance, of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate and the corresponding amine and thiol prepolymers. Other suitable polymers, such as those derived from 1,4-butadiene; isoprene; 2,3-dimethylbutadiene; 2-chloro-1,3-butadiene; 2-cyano-1,3-butadiene; and other polymerizable ethylenically unsaturated monomers such as δ-olefins of up to 12 carbon atoms such as ethylene, propylene, butene, etc.; styrene acrylonitrile, acrylic acid or ester, methacrylic acid or ester, vinyl chloride, vinylidine chloride, and the like; hydroxyl-terminated condensates of phenol and lower aldehydes and hydroxy-terminated polyepoxides. A particularly suitable hydroxy-containing compound is styrene-vinyl alcohol copolymer, made by copolymerizing styrene and vinyl acetate and partially or fully hydrolyzing the acetate groups to alcohol groups.

The preferred compounds are the polyols, particularly the polyester and polyether polyols.

The functionality of the cyclic nitrile component and the organic nucleophilic component may be 1 but is preferably at least 2. It is often desirable that the functionality of one of both of the reacting components be higher than 2. In general, it is preferred that the cyclic nitrile compounds used have a functionality of two and the functionality of the organic polyols, polyamines or polythiols be varied since it is much more economical to prepare polyfunctional hydroxyl amine, and thiol compounds than polyfunctional cyclic nitrile compounds.

The ratio of cyclic nitrile compound to organic polyol or polythiol compounds may vary depending upon the desired properties of the product and the functionality of the reacting materials. In general, it is desired to use amounts of cyclic nitrile compound and organic polyhydroxyl, amine and/or polythiol compounds that will provide a ratio of cyclic nitrile functional group to total polyhydroxyl, polyamine, and polythiol groups of about 0.7 to 10:1 and preferably about 0.7 to 1.4:1. The same ratios apply when using a prepolymer and additional monomer in the composition, i.e., the ratio of the component having the reactive cyclic nitrile groups to the component having the reactive hydrogen-containing groups is desirably such that there are 0.7 to 10 and preferably 0.7 to 1.4 cyclic nitrile functional groups per each reactive hydrogen-containing group in the composition.

The catalyst system used in the invention is comprised of
1. A metal ion selected from the metals of Group III to V of the Periodic Table of the elements, and
2. A fatty acid salt of an alkali metal.

The metal ion of the Group III to V metals is supplied as a compound having sufficient solubility in the reaction medium to provide a catalytically effective amount of metal ion. Suitable compounds include inorganic compounds, such as titanium tetrachloride, bismuth (III) nitrate, and aluminum hydride and organometallic compounds, such as lead naphthenate, dibutyl tin dilurate, tetrabutyl titanuate, aluminum isopropoxide, bismuth acetate, dialkyltin oxides, trialkyltin oxides, dialkyltin alkoxides, and trialkyltin alkoxides.

The fatty acid salt of the alkali metal is made from a fatty acid which will produce a salt having a sufficient solubility in the reaction medium to provide a catalytically effective amount of alkali metal ion. It has been determined that fatty acids having about 10 to 24 carbon atoms produce the most desirable alkali metal salts for use in the invention. Lower fatty acid salts can be used but these are less soluble in most organic reaction systems. Fatty acids having more than about 24 carbon atoms can also be used but they are less mobile and not as desirable. It is preferred that the fatty acid used to make the alkali metal salt be saturated since unsaturated fatty acid salts may be detrimental to the oxidative and light stability of the product. The preferred acid is stearic acid because of its ready availability and low cost. The preferred alkali metals are sodium, potassium, and lithium. A particularly suitable fatty acid salt is sodium stearate.

The amounts and ratio of catalysts employed will also vary depending upon the type of product, the temperatures, and the desired properties of the product. By way of example, the alkali metal salt of an organic acid is desirably present in an amount of from about 0.01% to about 5%, preferably from about 0.1 to about 2% by weight, based on the weight of the reactants. The metal ion of Groups III to V of the Periodic Table may be present in an amount of about 0.1% to about 5%, preferably from about 0.1% to about 2%, by weight of the reactants. Amounts above or below these ranges may sometimes be effectively used but it is preferred that the concentration of alkali metal-organic acid salt and metal ion be within these limits. The mole ratio of alkali metal-organic acid salt to Group III to V metal ion may be up to about 2:1 and preferably in the range of 0.3 to 1:1.

The reaction is generally carried out at a temperature between about 50°C. and 150°C. and preferably between 70°C. and 120°C.

The reaction which is catalyzed by the improved method of the present invention may be carried out as a single stage operation or in multiple stages employing more of the same or different cyclic nitrile compound reactant or the same or different H-containing nucleophilic compound. Thus, in polymer product production, the process, for example, may be what is termed in the art as a "one-shot" process. Alternatively, a prepolymer of the cyclic nitrile compound reactant and the active hydrogen-containing reactant can be prepared by employing an excess of either reactant but preferably an excess of the cyclic nitrile compound reactant. The prepolymer formed may then be subsequently reacted with either more of the same or a different nucleophile depending on the groups terminating the ends of the prepolymer.

When the nucelophilic compound contains an active hydrogen in a hydroxyl group, the mono- or polyurethane products are prepared; while if the group containing the active hydrogen is an amino group, mono- or poly-urea products are obtained. Reaction of the cyclic nitrile adduct reactant with both a hydroxyl group-containing compound and an amino group-containing compound, either simultaneously or sequentially, provides urea-urethane products. And when the nucleophilic compound contains an active hydrogen in a mercapto group, then mono- or polythio-urethane products are obtained.

As indicated above, the improved process of the present invention has been found to be capable of providing polycondensation products having exceptionally high molecular weights, for example, having weight average molecular weights of about 150,000 or higher. Moreover, where these poly-condensation products are prepared from difunctional cyclic nitrile compounds and difunctional nucleophilic compounds, they are soluble in a variety of organic solvents, such as chloroform, tetrahydrofuran, dimethylformamide, dimethylsulfoxide, and aromatic hydrocarbon solvents. This unique solubility characteristic of the high molecular weight polymers is apparently a result of a substantially linear (i.e., non-crosslinked) configuration of the polymer molecules, which configuration is further evidenced by the thermoplastic character of the products. Especially preferred polycondensation products of the present invention are those having weight average molecular weights of at least about, say, 200,000 or even 300,000; and further unique are those products of greater than about 500,000 molecular weight. Preferably, these are obtained from difunctional reactants and are soluble in, for example, chloroform, although it is recognized that even the difunctional reactants-derived products of the present invention become less soluble as their molecular weights increase.

It is possible in accordance with the present invention to produce cellular or nonporous plastics, including films, coatings, adhesive layers, impregnated compositions, castings, moldings, and the like. However, in the production of polyurethane foams by the process of the invention it is not necessary, as it is in conventional prior art processes, to employ an extraneous foaming or blowing agent since the cyclic nitrile compound reactants contain their own internal or "built in" blowing agent namely, the gas they evolve during reaction with the nucleophilic compounds. Conventional foaming agents, however, may be employed if desired, among which may be listed - low boiling solvents, such as benzene, toluene, acetone, ethyl ether, butyl acetate, methylene dichloride, carbon tetrachloride, and the like, as well as agents which will decompose to evolve an inert gas as, for instance, ammonium carbonate, sodium bicarbonate, N,N'-dimethyl-N,N'-dinitrosoterephthalamide, para, para'-oxybis (benzene-sulfonic acid), azodicarbonamide, benzene sulfonyl hydrazide, azobisisobutyronitrile, paratertiary butyl benzoylazide, and the like.

Formulation of polyurethane foams can follow the well-established practice of the art with the notable exception that the conditions of the reaction between the cyclic nitrile compound and nucleophilic compound be controlled to effect the reaction at a rate slow enough to preclude escape of the evolved gas before gelation to the extent sufficient to entrap the evolved gas and form a cellular, elastomeric polyurethane has occurred.

When preparing foamed products by the method of the present invention, it is generally preferred to employ at least a trifunctional reactant, which can be either the cyclic nitrile compound, the nucleophilic compound or both. Thus, for example, excellent polyurethane foams can be prepared by condensing a difunctional cyclic nitrile compound with a triol to yield a cross-linked product.

If desired, surface active agents might be in concentrations of about 0.1 to 5% by weight of the reactants to stabilize the foam. Generally used are silicone emulsifiers and non-ionic surface active agents, such as ethylene oxide condensates of vegetable oils, alcohols, and organic acids.

In accordance with the usual practice, inert, inorganic or organic fillers or both, and other additives may be included in the reaction mixture. Suitable inert, inorganic materials include, for example, clay, talc, silica, carbon black, asbestos, glass, mica, calcium carbonate, antimony oxide, and the like. Organic fillers include, for instance, the various polymers, copolymers, and terpolymers of vinyl chloride, vinyl acetate, acrylonitrile, acrylamide, styrene, ethylene, propylene, butadiene, divinylbenzene, etc. Other additives which may be added include plasticizers, such as dioctyl phthalate, di(2-ethylhexyl) adipate, etc., extenders, softeners, coloring agents, and emulsifiers.

The polymeric products produced by the invention have many uses.

For example, they are excellent materials for use in the preparation of castings, molds, sealants, potting compounds, insecticides, adhesives, coatings, films, foams, etc.

In a typical method of preparing, for example, polyurethanes by the process of the present invention, the polyol reactant is degassed prior to being admixed with either the catalyst or the cyclic nitrile compound. The purpose of the degassing is to remove water and molecular oxygen from the system. Water might serve to react with and dilute the effect of some of the catalysts which can be used in the present process; also, it can react with the cyclic nitrile compound under certain conditions. Certain hydroxyl group-containing compounds, e.g., poly (tetramethylene ether), are sensitive to molecular oxygen at the present reaction temperatures. Thus, the reason for preferring, under appropriate circumstances, to purge moisture and oxygen from the hydroxyl group-containing reactant. The degassing can often be accomplished by subjecting the polyol to a temperature of about 60° to 150°C. at about 0.25 to 50 mm. Hg pressure for from 15 to 60 minutes. After the addition of the catalyst, further degassing — say, for up to about 4 hours — under the same conditions may be conducted. After addition of catalyst and such further degassing, a substantially oxygen-free atmosphere, for example, a nitrogen or other inert gas atmosphere, is advantageously created and maintained in the reaction vessel, during which time the desired cyclic nitrile compound is added, preferably in small portions over periods of, say, about three minutes to two hours. During the addition of the cyclic nitrile compound, the reaction mixture can be stirred. Following complete addition of the cyclic nitrile compound the temperature of the reaction mixture is maintained at a level and the reaction time is selected so as to produce the desired product. The reaction mixture is advantageously stirred during the reaction. It is often advantageous to add a solvent for the urethane product, such as xylene, to the reaction mixture gradually, as the mixture thickens, to keep the mixture at a stirable viscosity. This is especially so where the product is a thermoplastic polyurethane. The amount of solvent added will preferably not exceed the total weight of the reactants. Preferred solvents for this purpose are aromatic solvents and cyclic ether solvents which are liquid at room temperature, having boiling points of at least about 60°C., and contain no ester or nitro groups. Examples of such include, in addition to the xylenes, amylbenzene, bromobenzene, chlorobenzene, substituted toluenes, such as butyl-, chloro-, bromotoluenes, dioxane and tetrahydrofuran, etc.

The following working examples of the present invention illustrate specific embodiments. Unless otherwise indicated, parts and percentages are on a weight basis.

EXAMPLE I

To a two-liter resin kettle fitted with a mechanical stirrer, a condenser, and a trap, a nitrogen inlet port, dropping funnel, and an oil bath heater are added 523.17 gms of a polytetramethylene ether glycol (OH number equivalent to $1.0499 \times 10^{-3}$ eq./gm), 1.47 gms of dibutyltin oxide, and 1.83 gms of sodium stearate. This mixture is then degassed, while stirring, for 45 minutes at 100°C. and 30 MM Hg pressure. Nitrogen is introduced into the resin kettle to create a nitrogen atmosphere. The nitrogen atmosphere is maintained throughout the remainder of the reaction by use of a nitrogen sweep. To this reaction flask is added 16.47 gms of 1,4-butanediol dissolved in 16.47 gms of dry dioxane. The container containing the dioxane-1,4-butanediol solution is washed with 30cc of dry dioxane and the wash solution is added to the resin kettle. A solution consisting of 106.05 gms of 99.3% purity adipo-di(nitrile carbonate) (ADNC) dissolved in 20 ml. of dry dioxane is then added over 50 minutes via a dropping funnel and the funnel is then washed out with 30 ml of dry dioxane. Heating of the reaction mixture at 100°C. is continued for an additional 4.5 hours after completing the addition of ADNC during which time additional dry dioxane is added as needed to keep the viscosity low enough for stirring. Collectively, 800 ml of dioxane is used throughout the reaction. The polymer which results is dried and its inherent viscosity is determined at 30°C. using a solution containing 0.2 gms of polymer dissolved in 100 ml of dimethylformamide. The inherent viscosity is 0.90.

Both the dioxane and the 1,4-butanediol used in this experiment are dried before using by adding 1 lb./gal. of 4A molecular sieves to each of these compounds at least 24 hours before use. The dioxane is further purified by filtering through neutral alumina just prior to use.

EXAMPLE II

A thermoplastic polyester polyurethane is produced using the procedure described in Example I and the following formulation:

|  | Wt. gms. |
|---|---|
| Polyesterglycol* | 556.96 |
| 1,4-butanediol | 16.4 |
| ADNC | 106.05 |
| Dibutyltin oxide | 1.47 |
| Sodium stearate | 1.83 |

The resulting polymer has an inherent viscosity of 0.65.

*The polyester glycol is a product derived from isophthalic acid, adipic acid, and 1,6-hexanediol and having a hydroxyl number of 55.3.

EXAMPLE III

A thermoplastic polyetherpolyurethane is prepared by repeating the reaction described in Example I but using 2.30 gms of dibutyltin di-n-butoxide in place of dibutyltin oxide. The inherent viscosity of the resulting polymer is 0.75.

EXAMPLE IV

A thermoplastic polyetherpolyurethane is prepared by repeating the reaction described in Example I but using 3.44 gms of tetrabutyl dilauryl distannoxane in place of dibutyl tin oxide. The inherent viscosity of the resulting polymer is 0.69.

The above examples illustrate the utility of the catalyst system of the invention in the preparation of urethane-type polymers.

Although the invention has been described with particular reference to specific examples, it is contemplated that modifications of these may be employed and, accordingly, the breadth of the invention is to be limited solely by the scope of the appended claims.

I claim:
1. In the method of preparing an organic compound having one or more urea, urethane or thiourethane groups obtained by condensing
    a. A nucleophilic organic compound having at least one reactive hydrogen-containing radical selected from the group consisting of primary amino radicals, secondary amino radicals, hydroxyl radicals, and mercapto radicals with
    b. A cyclic nitrile compound having the structure

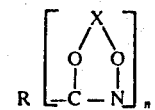

wherein X is

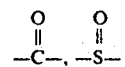

or

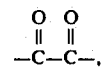

R is an organic radical which consists essentially of carbon and hydrogen and is free of reactive hydrogens as determined by the Zerewitinoff test and $n$ is 1 to 4, the condensation which comprises catalyzing the condensation reaction by contacting said (a) and (b) with a catalytically-effective amount of
    c. The catalyst combination of
        1. A metal ion selected from the metals of Groups III through V of the Periodic Chart of the Elements, and
        2. An alkali metal salt of a fatty acid.
2. The improvement of claim 1 wherein said first and second metals are present in the catalyst combination in a ratio of about 0.2 to 4 molar equivalents of said first metal per molar equivalent of said second metal.
3. The improvement of claim 2 wherein $n$ is 2 to 4.
4. The improvement of claim 2 wherein said nucleophilic compound is a polyhydroxyl compound.
5. The improvement of claim 1 wherein said alkali metal is sodium, potassium or lithium.
6. The improvement of claim 5 wherein said fatty acid contains 10 to 24 carbon atoms.
7. The improvement of claim 6 wherein said metal ion is selected from the group consisting of aluminum, titanium, tin, lead, and bismuth.
8. The improvement of claim 1 wherein said nucleophilic compound is a polyhydroxyl-containing compound and said cyclic nitrile compound is a cyclic nitrile carbonate.
9. The improvement of claim 8 wherein said cyclic nitrile carbonate is adipodi(nitrile carbonate).
10. The improvement of claim 9 wherein said alkali metal salt of a fatty acid is sodium stearate.

* * * * *